United States Patent [19]

Karube

[11] 3,899,660

[45] Aug. 12, 1975

[54] MECHANISM FOR MAINTAINING A COUNTER AT ITS RESET POSITION

[75] Inventor: Yukuo Karube, Yokohama, Japan

[73] Assignee: Canon Kabushiki Kaisha, Tokyo, Japan

[22] Filed: Dec. 11, 1973

[21] Appl. No.: 423,773

[30] Foreign Application Priority Data

Dec. 25, 1972 Japan ................................ 48-2396

[52] U.S. Cl............. 235/103; 235/95 R; 235/144 R

[51] Int. Cl.$^{2}$...................... G06C 15/42; G06M 1/28

[58] Field of Search.... 235/91 R, 103, 95 R, 130 R, 235/144 R, 144 MA, 144 PN

[56] References Cited

UNITED STATES PATENTS

| | | | |
|---|---|---|---|
| 2,123,944 | 7/1938 | Hamill | 235/144 MA |
| 2,778,471 | 1/1957 | Kuhn | 235/144 PN |
| 3,687,397 | 8/1972 | Suzuki et al. | 235/103 |

*Primary Examiner*—Stephen J. Tomsky

*Attorney, Agent, or Firm*—Fitzpatrick, Cella, Harper & Scinto

[57] ABSTRACT

A counting device for counting the number of revolutions or for counting the travelling amount of a tape for the tape recorder. The counting device is provided with a mechanism for maintaining a reset button in an operating condition thereof during the rewinding of the tape, said mechanism being automatically released when the tape starts to be unwound, thus providing an automatic counting. The value or figure in an initial state of counting is not limited to "O" but may be otherwise selectively determined.

7 Claims, 7 Drawing Figures

MECHANISM FOR MAINTAINING A COUNTER AT ITS RESET POSITION

BACKGROUND OF THE INVENTION

1. Field of the Invention

The present invention relates to counting devices for counting the number of revolutions or travelling amount of tape and more particularly to a counting device which can effectively count a travelling amount of tape for a tape recorder.

2. Description of the Prior Art

Various decimal rotation counters have been proposed in the past, and various tape recorders which incorporate such counters as a tape counter are in the market. However, in a tape recorder having such a conventional counter, when it is desired to obtain a total travelling amount of a tape from the start in unwinding operation which is carried out after the completion of the rewinding, a reset button for the tape counter has to be depressed to set the indication of the counter at zero, after the tape is completely rewound and the rewinding rotation thereof is stopped. Namely timing for setting the indication on the counter to "0" is limited merely to the time when counting is started, so that if timing for such setting should be slipped through carelessness, a miscount of the total travelling amount from the beginning would occur.

In FIG. 1, there is shown a conventional counter 1, in which when a reset button is designated at 2 is depressed in a direction as indicated by *a* and is moved to the position as indicated by the dotted line, indication 2′ on the counter 1 is set to "0" by means of a resetting mechanism not shown and at the same time a counting mechanism is released to place it in an inoperative condition, and when the button 2 is released, the counter is brought in an operative condition. The counter is driven by a pulley 3, that is, rotation associated with the travelling of the tape is transmitted to the pulley to thereby drive the counter. In the conventional counter, therefore, when the reset button 2 is released, the counting condition in the form of addition or subtraction would be determined according to the driving direction of the pulley 3, and unless the button 2 is kept depressed till counting is started, or the button 2 is depressed at the time when counting is started and released immediately, the desired travelling amount may not be obtained. For this reason, it is not possible to arbitrarily select a timing for depressing the reset button 2.

SUMMARY OF THE INVENTION

It is an object of this invention to provide a novel counting device which overcomes the problems noted above.

It is a further object of this invention to provide a counting device which can suitably select timing for setting the counter at a specific value in an initial state of counting, for example, to 0, and which permits an automatic start of the counting.

It is another object of this invention to provide a counting device by which an operator can obtain, in utilization of a tape recorder, the travelling amount of a tape in a state of recording or re-recording without imposing a mental burden on the operator.

Other objects of the invention will become apparent from the description of the embodiment with reference to the accompanying drawings.

DESCRIPTION OF THE PREFERRED EMBODIMENTS

Figure 1A:
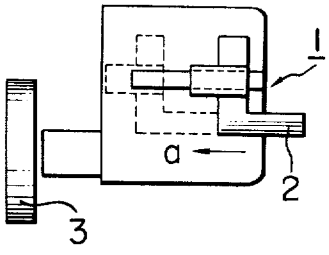
FIG. 1(A) is a side view of a conventional counter.
Figure 1B:
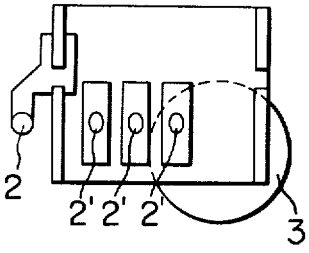
FIG. 1(B) is a front view of the same.

FIGS. 2 – 6 illustrate on embodiment in which a counting device according to this invention is applied to a tape recorder to serve as a tape counter. In the drawings, a counter 4 is shown comprising a reset button 5 and a pulley 6, said counter having the same function in counting and resetting as the conventional counter shown in FIG. 1.

A structural member on the body of a tape recorder is shown at 7 which secures a counter 4, and a back plate for the counter 4 is shown at 7′. To the body of the tape recorder is secured a shaft 8, on which an operating member 9 is rotatably mounted. A spring 10 is provided to urge said operating member 9 to move in a clockwise direction on said shaft 8 and the movement of said member is controlled at its one position by a stopper 11 fastened to the body of the tape recorder.

A switch 12 generates a trigger signal for rewinding the tape not shown, and when this switch is turned ON (brought in a state shown by the dotted line), the tape starts to be rewound by means of a control device not shown and is automatically stopped by means of known tape end detecting means, etc., in the position of the tape end, i.e., in the position of the beginning of winding in a proper direction.

A shaft 14 is secured to the back plate 7′ for said counter 4, movable levers 15 and 16 are secured to said shaft 14, and a pin 17 is planted on said pulley 6 corresponding to the lever 15.

A pin 18 is planted on the lever 16 extending to a position of the lever 15, and a spring 20 is interposed between said pin and a pin 19 planted on the lever 15 so as to urge both levers 15 and 16 to come close to each other so that the lower end of the lever 15 may be placed in contact with the pin 18 on the lever 16.

A pin 21 is planted on the part of the back plate 7′ for the counter, and a spring 22 is interposed between said pin and the pin 18 on the lever 16 so as to urge the lever 16 to move about the shaft 14 in a clockwise direction.

An opening 23 is provided in a part of the structural member 7 to cause the zero return button 5 to be moved in and out of said opening 23.

The button 5 has its end composed of an inclined portion 5*a* and an engaging portion 5*b*, and by the provision of such inclined portion 5a and engaging portion 5*b*, the button 5 may cooperate with the lever 16.

In the counting device constructed as above, when the operating member 9 is rotated in a direction as indicated by the arrow *b* against the spring 10, the reset button 5 is pressed in a direction as indicated by the arrow *c* and the end of said button is further projected from the opening 23 to cause the inclined portion 5a to contact with the end 16a of the lever 16, and the lever 16 moves towards *d* as the button 5 moves in the *c* direction.

Accordingly, the lever 16 is rotated in a counterclockwise direction about the shaft 14 against the spring 22, however, since the pin 18 planted on the lever 16 is connected by the pin 19 planted on the lever 15 and the spring 20, the lever 15 is also rotated in the *e* direction about the shaft 14 following the rotation of the lever 16.

Figure 2:
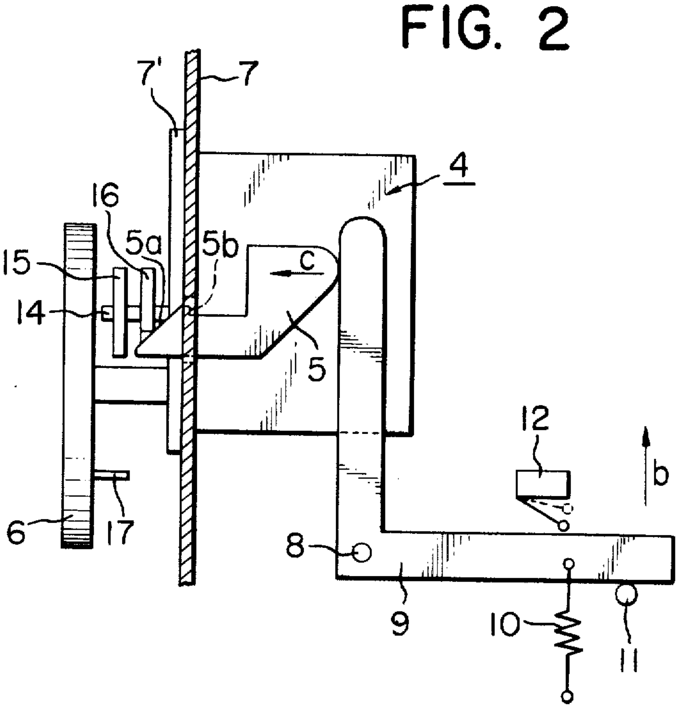
FIGS. 2 – 6 illustrate a counting device in accordance with the present invention, FIGS. 2 and 4 being side views and FIGS. 3, 5 and 6 being bottom views.
Figure 4:
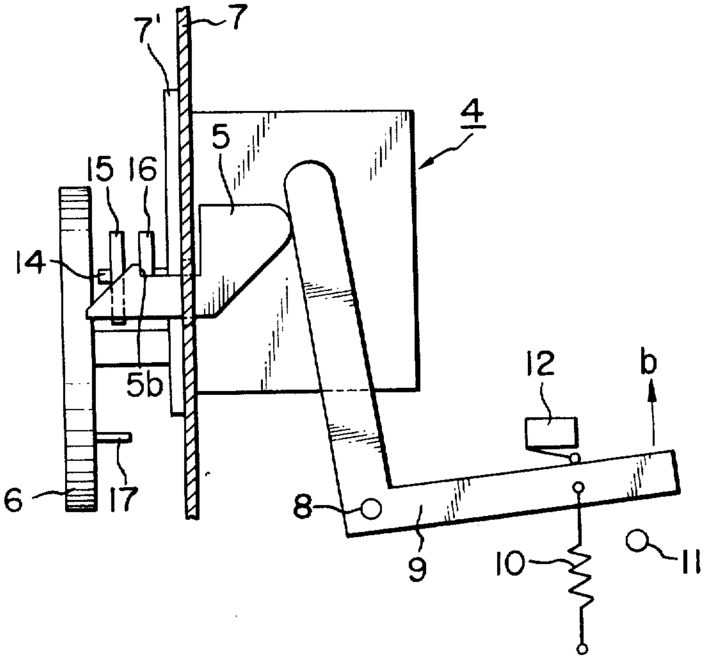
Figure 5:
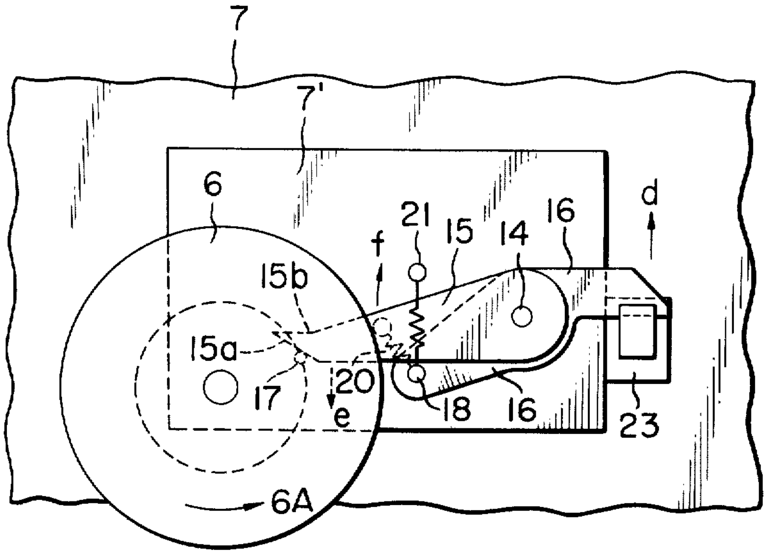

When the operating member 9 is further rotated in the *b* direction, the switch 12 is placed in ON and the button 5 further moves in the *c* direction, as shown in FIG. 4. That is, the end 16*a* of the lever 16 is brought in engagement with the engaging portion 5b of the button 5, the levers 15 and 16 are placed in conditions, respectively, as shown in FIG. 5, and the end of the lever 15 moves to be positioned within the range of a locus of the pin 17. When the reset button 5 is moved in the *c* direction, the indication on the counter may be reset to 0 by means of a reset mechanism associated with the botton 5. Even if the operating member 9 is returned to the position as shown in FIG. 2 after such condition as described above has been maintained, the button 5 and levers 15, 16 are held in the condition shown in FIG. 5.

If predetermination is made so that the pulley 6 rotates in a direction as indicated by the arrow 6A when the tape is rewound while the pulley 6 rotates in a direction as indicated by the arrow 6B when the tape is moved in a proper direction, the tape recorder is already in operation for rewinding the tape by means of the switch 12 when the levers 15, 16 are brought to the condition shown in FIG. 5 so that the pulley 6 may be rotated in the 6A direction.

Therefore, the pin 17 is placed in contact with the lever 15 in the certain position, but, as is apparent from the figure, since the end of the lever 15 has its part formed as a disengaging portion 15a, and when the pin 17 is placed in contact with said disengaging portion, only the lever 15 moves in the *b* direction against the spring 20 and the pin 17 continues to rotate in response to the rotation of the pulley 6, while disengagement of the pin 17 with the lever 15 causes the lever 15 to be returned to the position as shown in FIG. 5. As long as the pulley 6 continues to rotate in the 6A direction, the aforesaid operation is repeated and the reset button 5 is maintained in the depressed position (i.e., reset mechanism is remained operative).

Namely, when the tape is rewound, the reset button is held in the depressed condition, thus the counter 4 remaining to indicate 0.

Figure 6:
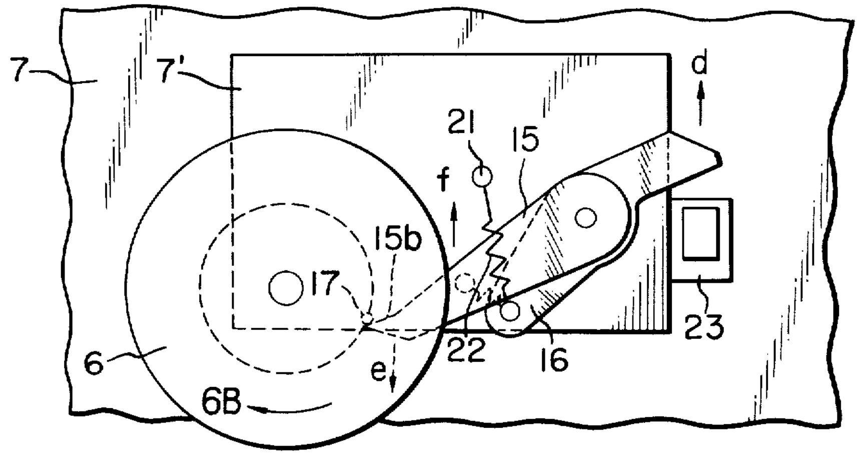

If the tape is fed in an unwinding direction followed by the rewinding as described, the pulley 6 on the counter 4 begins to rotate in the 6B direction as shown in FIG. 6. Thus, the pin 17 is naturally rotated in the 6B direction to contact with the end of the lever 15. Since the end of the lever 15 in contact with the pin 17 moved in the direction as just mentioned is formed as an engaging portion 15*b*, the lever 15 is also moved in response to the movement of the pin 17 and the pin 18 planted on the lever 16 is in contact with the lever 15, so that the lever 16 is also moved in a counterclockwise direction about the shaft 14 in response to the movement of the lever 15.

Figure 3:
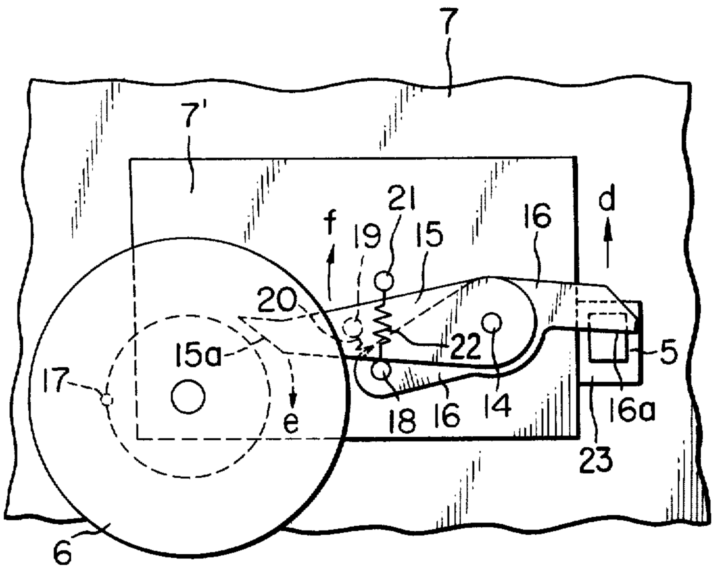

Such movement of the lever 16 in the counterclockwise direction causes the engaging portion 5*b* of the button 5 to disengage from the end 16*a*, and the button 5 is then returned to the position as shown in FIG. 2 (a spring, though not shown, which urges the button 5 in a direction opposite to *c*, is encased within the counter 4). When the pulley 6 is further rotated in the 6B direction to release the pin 17 from the contact with the lever 16, the levers 15 and 16 are placed in the condition as shown in FIG. 3 by means of the spring 22, and the end of the lever 15 is no longer positioned within the rotating locus of the pin 17 and thus placed in the condition not influenced by the pin 17.

When the reset button 5 is returned in this way, the counter 4 begins counting, which means that if the tape starts to move in an unwinding direction and the pulley 6 is rotated by at least one full revolution, the reset mechanism is released to initiate counting.

According to the counting device of the present invention, as explained above, are provided means for resetting the counter indication to a selected point, which is, in the embodiment described above, a reset button for resetting at 0, and means for maintaining the reset means in its operative position, the maintaining means automatically releasing the reset means at the start of counting in a certain direction to permit counting operation. Therefore, in the case that such a counting device as described is used as a tape counter for the tape recorder, a preparation for counting operation may be carried out in such a manner that the tape counter is reset to 0 whenever the tape is being rewound so that such a zero condition may be maintained during the rewinding of the tape. When the tape is then unwound, after the completion of the rewinding, the reset mechanism is automatically released, thereby permitting usual counting. Accordingly, timing for resetting the counter to 0 is never limited, as is encountered in conventional tape counters, and in addition counting may be automatically started, thus enabling one to carry out the operation very easily.

While the above-described embodiment has illustrated the counting device of the present invention used as a tape counter for the tape recorder, it is however not intended to limit the invention thereto. It should be also understood that the value to be returned by the depression of the return button, that is, the value in an initial state of counting is not limited to 0 but may be otherwise variously determined.

I claim:

1. A mechanism for maintaining a counter at its reset position until the start of forward rotation of a rotatable member, said counter counting the rotation of the rotatable member and being provided with a resetting member for resetting the counter to its initial position, said mechanism comprising:

- a first projection member provided on said rotatable member to project in a nonparallel direction with respect to the plane of the rotation of the rotatable member;
- a first lever engageable with an engaging portion of said resetting member, said first lever being pivotably mounted on a basic body;
- a second lever pivotably mounted on the basic body, said second lever being adapted to be disposed across a locus of the movement of said first projection member when said resetting member is engaged with said first lever;
- a second projection member mounted on said first lever within the range of the movement of said second lever, said second projection being engageable with said second lever when the rotatable member rotates forwardly;
- a first urging member for urging said first and second levers to approach each other, said first urging member being disposed between said first and second levers; and a second urging member disposed between the basic body and said first lever, said second urging member, when said resetting member is engaged with said first lever, effecting the urging action thereof to maintain the engagement between said resetting member and said first lever, and, when said resetting member is not engaged with said first lever, urging said second projection member to displace said second lever out of the locus of the movement of said first projection.

2. A mechanism according to claim 1 further comprising a third urging member for urging said resetting member to disengage from said first lever.

3. A mechanism according to claim 1 wherein said first lever and said second lever are mounted on a common axis.

4. A mechanism according to claim 1 wherein said first urging member is, at one end thereof, mounted on said second projection.

5. A mechanism according to claim 1 wherein said second urging member is, at one end thereof, mounted on said second projection.

6. A mechanism according to claim 1 wherein the side of said second lever on which said second lever abuts said first projection member when the rotatable member rotates forwardly, has a configuration for engagement with said first projection member.

7. A mechanism according to claim 6 wherein the other side of said second lever on which said second lever abuts said first projection member when the rotatable member rotates in reverse, has a configuration for disengagement with said first projection member.

* * * * *